No. 893,684. PATENTED JULY 21, 1908.
A. W. WHITCOMB.
POWER TRANSMITTING DEVICE.
APPLICATION FILED MAR. 30, 1906.
4 SHEETS—SHEET 1.
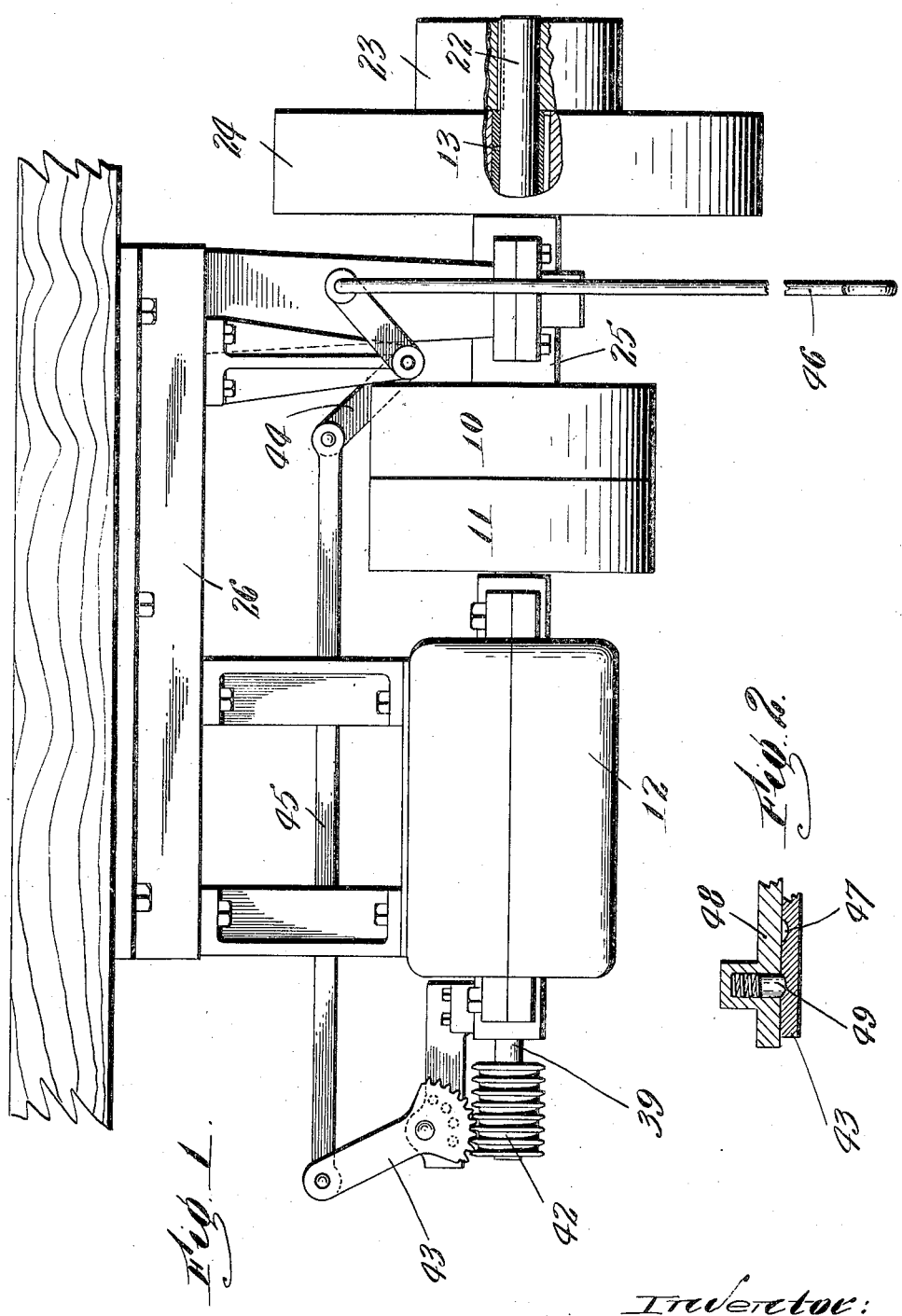
Witnesses:
C. F. Wesson
M. E. Regan
Inventor:
A. W. Whitcomb
By Attorneys
Southgate & Southgate

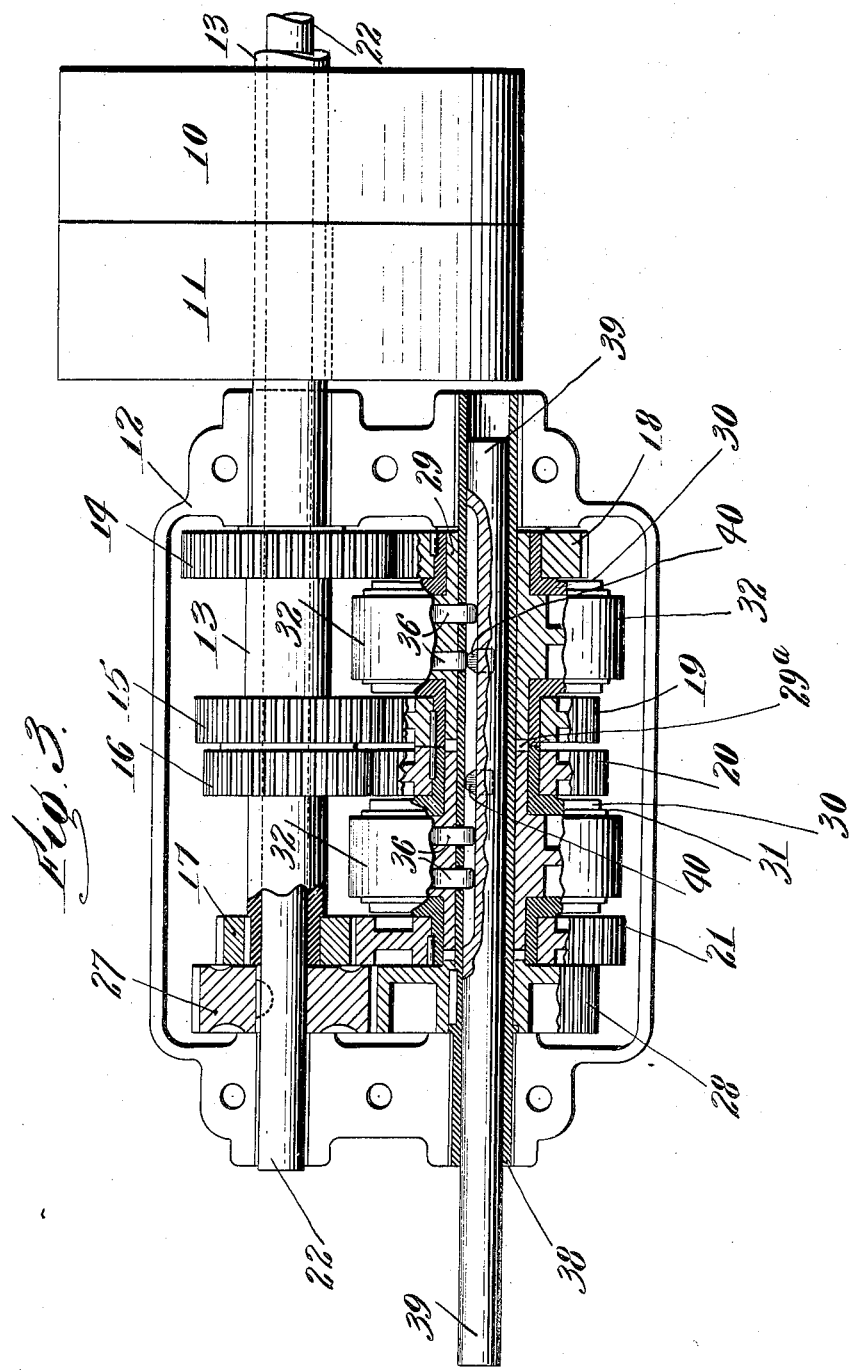

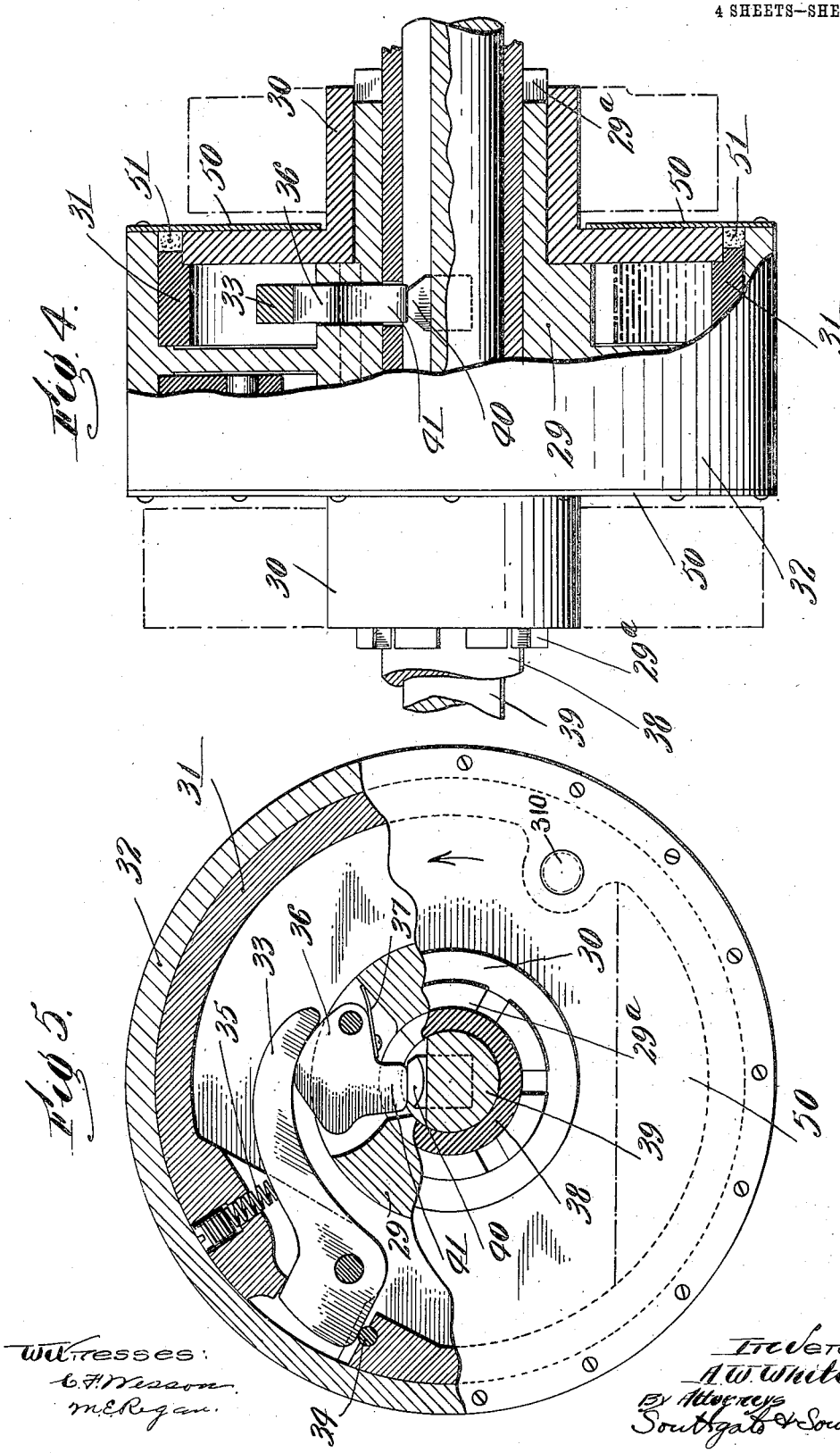

No. 893,684.

PATENTED JULY 21, 1908.

A. W. WHITCOMB.
POWER TRANSMITTING DEVICE.
APPLICATION FILED MAR. 30, 1906.

4 SHEETS—SHEET 4.

UNITED STATES PATENT OFFICE.

ALONZO W. WHITCOMB, OF WORCESTER, MASSACHUSETTS, ASSIGNOR TO WHITCOMB-BLAISDELL MACHINE TOOL COMPANY, OF WORCESTER, MASSACHUSETTS, A CORPORATION OF MASSACHUSETTS.

POWER-TRANSMITTING DEVICE.

No. 893,684.     Specification of Letters Patent.     Patented July 21, 1908.

Application filed March 30, 1906. Serial No. 308,844.

*To all whom it may concern:*

Be it known that I, ALONZO W. WHITCOMB, a citizen of the United States, residing at Worcester, in the county of Worcester and State of Massachusetts, have invented a new and useful Power-Transmitting Device, of which the following is a specification.

This invention relates to clutches. Heretofore they have been made in two types, friction clutches and positive clutches. Each one has its advantages and disadvantages. One important feature of this invention is the provision of a form of clutch which shall avoid the main disadvantages of both of these types and yet include some of their most important features.

The invention may be considered as a friction clutch in which one of the parts is operated in a substantially positive manner, so that, although the clutching action takes place progressively during the rotation of one of the rotary members, yet if the load is increased, no matter how suddenly, the clutching action will be increased in corresponding proportion and without any sudden meeting of positive clutching surfaces. Thus there is no possibility of the clutch being rendered inoperative by the excess of load as long as the parts remain intact, as any slipping of the friction clutch immediately results in more firmly forcing the friction surfaces together.

In use the operator at any time simply throws a lever or equivalent device, to set an element in position to cause the clutching action to take place progressively during the next rotation of one of the elements to be connected. In this way a friction clutch is secured in which the operation is as nearly as possible a positive one, and yet in which the clutching action takes place in such a manner that there is no sudden contact of teeth or other positive clutching surfaces and in which the control of the rapidity of operation of the clutching surfaces is entirely out of the hands of the operator.

While this invention is capable of general use, it is especially applicable to planers, and is shown as applied thereto.

Reference is to be had to the accompanying drawings which constitute part of this specification, in which Figure 1 is a side elevation of an overhead variable speed friction drive showing one application of my invention, parts being shown in section. Fig. 2 is a detail sectional view of a sector lock which I employ. Fig. 3 is a plan of the friction drive, parts being shown in section indicating interior construction. Fig. 4 is a side elevation partly in section of a portion of the clutch. Fig. 5 is an end elevation partly in section of the same with the parts in locked position. Fig. 6 is a view similar to Fig. 5 showing the parts in unlocked position, and Fig. 7 is a view similar to Fig. 4, showing another form in which a part of the invention may be constructed.

I have illustrated the device in the form of an overhead drive for convenience, but it will be understood that it is applicable to power transmitting devices in general.

I have shown a loose pulley 10 and a tight pulley 11 at the end of a casing 12, and mounted on a shaft 13. This shaft is provided with any desired number of gears 14, 15, 16 and 17 designed to mesh with corresponding gears 18, 19, 20 and 21 respectively, mounted on an axis parallel to that of the shaft 13. The shaft 13 is hollow, being in the form of a sleeve through which passes a shaft 22 mounted in a bearing on the casing. On this shaft is mounted a pulley 23 for giving variable speeds, while on the hollow shaft or sleeve 13 is keyed a pulley 24 for a constant speed.

It will be understood, of course, that in the form indicated in the drawings the casing 12 and the bearing 25 for the shaft 13 are mounted on a frame-work or support 26.

The device transmits power from the sleeve 13 through one of the gears thereon to one of the other gears, thence to the shaft 22. For this purpose the shaft 22 is provided with a gear 27 meshing with a gear 28 connected with a rotatable element in the general nature of a shaft. This rotatable element, in the form shown, is made up of a plurality of sections 29, each having teeth 29ª for engaging each other, and interlocking the several sections together, so that motion transmitted to one will be transmitted to the others, and through the gear 28 to the shaft 22.

In order that all of the gears 18, 19, 20 and 21, with a single exception, may be idle at all times I have provided the following mechanism: On the several rotatable elements 29, I have journaled a series of ring carriers 30. These are adapted to rotate freely on the sections 29. Each of these carriers 30 carries a friction ring 31 shown as connected therewith by a pin 310. As is usually the case, this ring is split and of such construction that it ordinarily remains in unexpanded position, and the motion of rotation is not transmitted between it and the inner bearing surface of a casing 32 which is mounted on each of the sections 29. The casing 32 and ring 31 constitute the two members of a friction clutch, one being carried by each of the rotary elements 29 and 30.

In order to provide for connecting the friction rings 31 with the friction casings 32, and especially to cause the friction rings while in motion to pick up the casings with a yielding or slipping action to avoid a violent shock, and yet to bring the bearing surfaces between the rings and casings into close and firm contact and positively lock the lever 33 in position so that the bearing surfaces and rings will be locked frictionally together independently of any frictional engagement of bearing surfaces, and to secure this locking action in the shortest practicable time, I have provided the following mechanism: Within each of the friction cases and pivoted on the ring 31 is a lever 33 adapted to engage a steel pin or other bearing surface 34 on the friction ring to operate the latter. A spring 35 is preferably provided for normally holding the lever out of operative position. Carried by each of the sections 29 is a lever operating device shown in the form of a pawl 36 which is normally held in inoperative position by a spring 37. This pawl is adapted to engage the inwardly curved arm of the lever and force it into such position as to expand the friction ring. It is to be observed also that even in the absence of the frictional action, the curved side of the pawl cannot pass the curved end of the lever, and as these two elements are carried by the parts 29 and 30, they will be securely locked or clutched together while the pawl 36 is held in position for engaging the lever 33, which may be done by a positive means, as will now be described.

For the purpose of operating the several pawls, I have provided the following mechanism: The sections 29 are made hollow in the form of sleeves and through them passes a sleeve 38 which is hollow and which carries a reciprocating rod 39. This rod is provided with one or more flat topped dogs 40 adapted to engage flat bottomed projections 41 on the pawls and force the pawls into operative position as is indicated in Fig. 5. By the use of these flat surfaces a positive holding action is secured, as no amount of force applied normally to these surfaces will move them or have any tendency to do so.

It will be understood, of course, that the number of gears 14, 15, 16 and 17 which are used will depend upon the number of different speeds desired. In the form illustrated, four speeds are secured in addition to the constant return, and for convenience the casings 32 are made double, each one being provided with two pawls and connected with a gear on each side. Two of these sets being shown, it is desirable to provide the rod 39 with two dogs 40 so spaced apart that only one of the pawls can be operated at the same time.

For the purpose of manipulating the rod 39, I have provided it with a rack 42. With this rack engages a pivoted sector 43 which is operated by a lever or bell-crank 44 connected with the sector by a link 45 and having an operating handle or rod 46. In order to prevent any accidental displacement of the sector from any position in which it may be placed, I have provided it with a series of notches 47 equal in number to the number of gears on the shaft 13.

In a plate 48 to which the sector is pivoted and by which it is supported, I have located a spring-pressed plunger 49 for engaging in the notches 47.

The friction casing is preferably made wide enough to extend out over the friction ring; and attached to the face of the casing is a thin plate 50 extending down over the face of the ring carrier. A packing 51 is provided at the edge of the friction ring. This construction provides an oil-tight compartment, so that a certain amount of oil can be placed in it to lubricate the parts without unnecessary loss. In Fig. 7 I have shown the apparatus as constructed without the oil-tight casing.

By the construction of a transmission mechanism in accordance with the principles herein set forth, whether in forms illustrated or otherwise, a most convenient and positively operating manner of accomplishing the desired results is secured by the employment of simple and efficient mechanism which can be readily kept in order and lubricated.

I am aware that the invention herein described may be greatly modified by a skilled mechanic without departing from the scope of my invention as expressed in the claims.

Having thus fully described my invention, what I claim is:—

1. The combination with two independently rotatable elements, of a friction clutch for connecting them, comprising two members, one rotatable with each of said elements, and means for progressively securing said elements together during the independent rotation of one of said elements with respect to the other, said means comprising a lever carried by one of the elements and adapted to operate one of the members of the clutch, and an operating device carried by the other element and rotatable therewith independently of the element which carries the lever.

2. The combination of two independently rotatable elements, with means carried by one of them for frictionally securing them together, and means carried by the other element for first progressively operating said first named means and for thereafter holding it during the continued rotary motion of the element, on which it is carried, with respect to the other element, whereby the parts may be connected gradually during a revolution to avoid violent shock.

3. In a power transmitting device, the combination of a rotary friction clutch member, a rotary friction ring, means for forcing said ring against said member, an element within the ring rotatable independently thereof, and means carried by said independently rotatable element for simultaneously operating said forcing means and locking it with respect to the friction clutch member.

4. In a power transmitting device, the combination of a friction clutch casing, a friction ring therein, a lever rotatable with said ring for forcing said ring against the casing, an element within the ring rotatable independently thereof, and means carried by said last named element for operating the lever and ring with respect to the casing.

5. In a power transmitting device, the combination of two independently rotatable elements, two friction clutch members, a movable pawl carried by one of said rotatable elements, and a lever carried by the other for operating one friction clutch member, said lever having an arm located in the path of the pawl and provided with means for limiting the motion of the pawl with respect to the lever.

6. In a power transmitting device, the combination of two friction clutch members, a movable pawl, and a lever for operating one friction clutch member, said lever having a curved arm located in the path of the pawl and adapted to limit the motion of the pawl with respect to the lever in one direction.

7. In a power transmitting device, the combination of two independently rotatable elements with a friction clutch comprising two members for connecting them, means carried by one of said rotatable elements for operating said clutch, and means carried by the other of said rotatable elements for positively holding the operating means in locked position.

8. In a power transmitting device, the combination of two independently rotatable elements with a clutch comprising two members, one carried by each of said elements, a pawl for operating said clutch carried by one of said elements, and a movable dog for operating said pawl, said dog having means for holding the pawl in locked position.

9. In a power transmitting device, the combination of two independently rotatable elements with a friction clutch for connecting said elements, a pivoted pawl for operating said friction clutch, said pawl having a projection provided with a flat surface, and a movable dog having a flat surface for engaging the flat surface on said projection and holding the pawl in locked position.

10. In a power transmitting device, the combination of two independently rotatable elements, a lever carried by one of said elements, and a pawl carried by the other, said pawl having means for operating the lever and said lever having means for frictionally connecting one of said elements with the other, and for positively limiting the motion of the other element with respect to the one on which the lever is mounted.

11. In a power transmitting device, the combination of two rotatable elements with a lever carried by one of said elements, and a pawl by the other, said pawl being adapted to operate the lever, and said lever having means for frictionally connecting one of said elements with the other, and means for limiting the motion of the pawl with respect to the lever.

12. In a power transmitting device, the combination of two rotatable elements, with a lever carried by one of said elements, and a lever operating device by the other, said lever having means for frictionally connecting one of said elements with the other and means for limiting the motion of the lever operating device with respect to the lever.

13. In a power transmitting device, the combination of two independently rotatable elements, a lever carried by one of said elements, and a lever operating device carried by the other, said lever having means for frictionally connecting one of said elements with the other, and having a curved surface for engaging the lever operating device, and a curved end for receiving said lever operating device in its clutched position, and for limiting the motion of the other element with respect to the one which carries the lever.

In testimony whereof I have hereunto set my hand, in the presence of two subscribing witnesses.

ALONZO W. WHITCOMB.

Witnesses:
ALBERT E. FAY,
LOUIS W. SOUTHGATE.